April 5, 1932.  A. C. GAYNOR  1,852,772
ELECTRIC SWITCH
Filed Oct. 3, 1928   2 Sheets-Sheet 1

INVENTOR.
Arthur C. Gaynor,
BY
ATTORNEY.

April 5, 1932.   A. C. GAYNOR   1,852,772
ELECTRIC SWITCH
Filed Oct. 3, 1928   2 Sheets-Sheet 2

INVENTOR.
Arthur C. Gaynor,
BY
ATTORNEY.

Patented Apr. 5, 1932

1,852,772

UNITED STATES PATENT OFFICE

ARTHUR C. GAYNOR, OF STRATFORD, CONNECTICUT

ELECTRIC SWITCH

Application filed October 3, 1928. Serial No. 309,978.

This invention relates to electric snap-switches, and has particular reference to the actuating mechanism and the mounting therefor.

An object of this invention is to improve the actuating mechanism of such switches to the end that the switch may give longer service, be safer for heavy loads, and yet may be economically manufactured.

Among the more important features of this invention is the provision of a supporting frame for the actuating mechanism having bearings and openings communicating with the bearings which are so arranged that the crank member of the actuating mechanism may be introduced to said frame by longitudinal movement through said opening. This arrangement permits the utilization of a strong hollow, box-like polyhedral frame, and yet permits the arms and bearing portions of the crank member to be made of one piece, preferably of a sheet metal stamping, which in consequence of the said arrangement may be formed so that its edges lie in planes transverse to the plane of oscillation of the crank and thus have less tendency to warp or distort in operation.

Another feature of this invention is the provision of the bottom and end walls of the polyhedral frame, so that they will act to limit the oscillatory movements of the crank member and rocker of the switch. By utilizing the end walls and bottom walls (which are at right angles to the end walls) for this purpose, the shock to the frame resulting in the blows produced when the crank member and rocker engage the walls is dissipated by mutual interference. Heretofore, it was proposed to arrange the stops so that the shocks would be in opposition to each other and in the same plane. With that arrangement, however, should the shock produced by one of the members be greater than that produced by the opposing member, the greater shock would tend to cause the member producing the lighter shock to rebound with its resulting increase in the wearing of the parts.

A further feature of this invention is the provision of fulcrums for the crank member in the form of knife-edge bearings having sides sloping downwardly from the points. Flat bearing portions of the crank member normally lie on either one or the other of these sloping sides, and in moving from one position of rest to the other, the flat bearing portions engage the points of the fulcrums and shift from one set of sloping sides to the other set. At the ends of each of the sloping sides of the knife-edge bearings there is provided a stop for engaging the edges of the flat bearing portions of the crank in the positions of rest of the latter. These stops are so disposed that the flat bearing portions are engaged by the points of the fulcrums at either one side or the other of the physical center of the crank, with the result that any tendency of the parts to stop in dead center positions is defeated by the sliding of the flat bearing portions of the crank down either slope of the knife-edge bearings.

And yet another feature of this invention is the provision of improved means for positively initiating the movement of the switch bar carrying crank by the manually operated rocker should the latter fail to move under the influence of the spring interposed between the crank and rocker. This means comprises lugs carried by the rocker, each adapted to move in the path of one of the flat bearing portions on the crank which is for this and other purposes made of sufficient width that a portion thereof always extends above the point of the adjacent knife-edge fulcrums on the frame. These lugs only engage the co-operating portion of the crank when the crank fails to move at the proper point in the oscillation of the rocker, and hence its operation puts no additional burden on the actuating mechanism except when actually needed. The need for the use of the initiating device seldom occurred, but occasionally the switch lever sticks to its cooperating contacts with such tenacity that the power of the operating spring is not itself sufficient to separate them. It is at that time that the initiating device comes into play and insures proper operation of the switch.

Other features and advantages will hereinafter appear.

In the accompanying drawings which illustrate one embodiment of this invention, that at present preferred—

Figure 1:
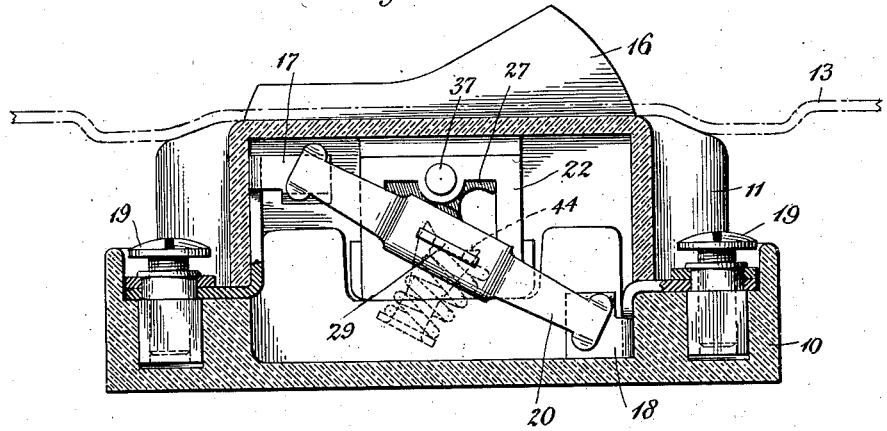
Figure 1 is a side elevation of a snap switch embodying the present invention, with portions of the base and casing shown in section to disclose the switch-actuating mechanism.
Figure 2:
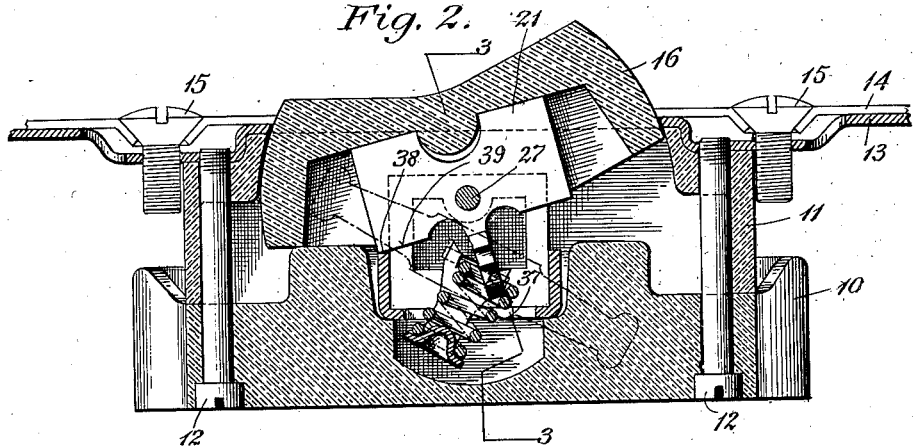
Fig. 2 is a longitudinal section through the center of the switch.
Figure 3:
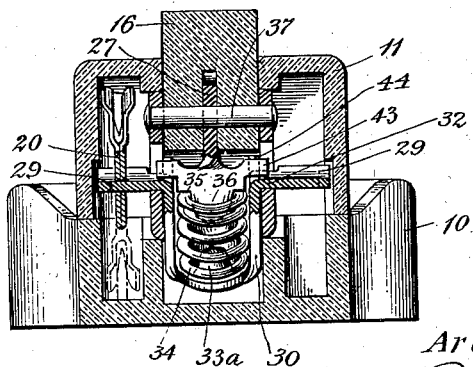
Fig. 3 is a transverse sectional view taken on the line 3—3 of Fig. 2.

The switch shown in the accompanying drawings, for the purpose of illustrating the present invention, comprises a base 10 having a cap or cover 11, see Figs. 1 and 2, through which pass two screws 12 threaded in a metal strap or bridge 13 by means of which the base and casing are held together in superposed relation. As shown, a flush plate 14 is secured to the bridge 13 by means of screws 15. The casing 11, metal strap 13 and flush plate 14 are provided with aligned openings through which a handle or finger-piece 16 forming part of the switch-actuating mechanism extends for manual operation. The handle 16 shown is made in accordance with my invention described and claimed in my co-pending application, Serial No. 276,886, filed May 11, 1928. Supported on the base 10 and mounted within the base and casing 11 are stationary contacts 17 and 18, each of which has in electrical engagement therewith a binding screw 19 for connection to the wires of an electric circuit to be controlled by the switch. As shown, the contacts 17 and 18 are electrically insulated from each other, for they are separately carried by the base 10 which is of insulating material. These contacts are constructed and mounted in accordance with my invention which is more fully described and claimed in my co-pending application, Serial No. 452,545, filed May 15, 1930.

The gap between the two contacts 17 and 18 is adapted to be bridged or closed by a switch arm 20, in one position of rest of the switch, and open in the other position of rest.

Figure 7:
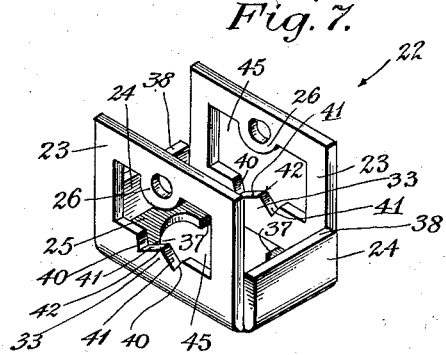

Movement of the switch arm 20 from one position of rest to the other is controlled by switch-actuating mechanism comprising the finger-piece or handle 16. This finger-piece 16 has molded in it or otherwise secured to it a rocker 21 pivotally mounted in a hollow box-like polyhedral frame 22 provided by the present invention and shown in detail in Fig. 7.

The frame 22 comprises side walls 23, end walls 24 and bottom walls 25, the top of the frame being open to permit the bodily movement of the rocker 21 and finger-piece 16 between the side walls 23 of the frame. The side walls have near their upper edges bearings 26 thru which a pin or other axle 27 may be slid to provide a fulcrum for the rocker 21 and finger-piece 16.

The switch-actuating mechanism also comprises a crank member 28 which is approximately U-shaped and which has horizontal extensions 29 on its vertically extending arms 30. The arms 30 of the crank are adapted to lie within the frame 22 and to protrude through an opening 31 in the bottom thereof, lateral movement of the crank in the frame being limited by the engagement of the arms 30 of the crank with the side walls 23 of the frame. The extensions 29 of the crank have flat bearing portions 32 adapted to engage knife-edge bearings 33 provided on the side walls 23 of the frame and the outer portions of the extensions 29, or either of them, may carry the switch arm or arms 20.

The base of the U-shaped crank member 28 is provided with a seat 33a for a compression spring 34, the upper end of which is engaged by shoulders 35 on the rocker 21 whi¹ a projection 36 thereon extends into the upper convolutions of the coil. At all times the spring 34 is under compression, and in the positions of rest of the switch such as is shown in Figs. 1 and 2, the spring holds the crank 28 and switch arm 20 at the limits of their movements and at the same time holds the rocker 21 and the finger-piece 16 at the limit of its movement. When it is desired to operate the switch, the protruding portion of the finger-piece 16 which protrudes through the flush plate 14 is depressed, causing the shoulders 35 on the rocker 21 to depress the spring and place it under great compression. This compression of the spring is effected without causing movement of the crank because of the toggle action between the spring and rocker, and continues until the upper end of the spring is carried substantially beyond the axis of oscillation of the crank, at which time the spring reacts and causes the crank to swing to the other position of rest and at the same time completes the rocking movement of the rocker and finger-piece. The movement of the crank is rapid, being under the sole control of the spring after the critical point has been passed, and therefore causes a quick break to occur between the switch arm 20 and its cooperating contacts 17 and 18, so as to reduce the duration of any arc resulting from the break.

In order to limit the movements of the crank and rocker in such a way that the shocks resulting from the snap action of these parts is dissipated, the opening 31 in the bottom of the frame 22 is provided with shoulders 37 close to the side walls 23 and adapted to engage the vertical arms 30 of the crank, and the end walls 24 of the frame 22 are terminated at such a height that the edges 38 thereof will be engaged by the bottom edges 39 of the rocker. Thus, in position of rest, the arms 30 of the crank 28 engage the shoulders 37 on the bottom wall 25 at one side of the center of the frame while one edge 39 of the rocker 21 engages the upper edge 38 of the end wall 24 at the same side of the frame. When the switch is operated, however, the crank moves to engage the shoulders 37 at the other side of the frame and the other edge 39 of the rocker engages the upper edge 38 of the other end wall of the frame. Thus it will be seen that the vector of the force applied to the end wall 24 is in a vertical direction while the vector of the force applied to the bottom wall 25 is in substantially horizontal direction, and consequently these forces are dissipated by mutual interference and do not merely oppose each other. When the shocks of stopping these rapidly moving parts are absorbed by mutual interference or dissipation, there is no tendency for the member imparting the weaker shock to rebound as is the case when the shocks are taken in opposition to each other and in the same plane. It should be noted that these stops are conveniently provided in the sheet metal frame 22 because the latter has a substantially hollow box-shaped form.

One of the difficulties heretofore encountered in snap-switches, having as a sole connection between the operating and operated part a resilient member such as the coil spring 34, has been the danger of these two parts coming to rest for one reason or another in a position where the spring lies in line with the axis of oscillation of the rocker and crank, that is to say, when a "dead center" position is reached. This danger is mitigated to a substantial extent by the provision of knife-edge bearings for either the operated or operating member, for in this way a sharp fulcrum point may be had giving a very unstable support for its cooperating member in the "dead center" position. This is the structure disclosed herein, for the knife-edge bearing 33 in the frame engages the flat bearing surfaces 32 on the crank. The present invention, however, goes a step further in obviating this difficulty by providing means whereby the axis of oscillation of the crank is off-set from the physical center thereof and located at the side of said center at which the crank lies in its position of rest. The effect of this arrangement is to make it necessary that the upper end of the spring be moved beyond the axis of oscillation of the crank a substantial distance before the spring is permitted to expand and cause oscillation of the crank.

Figure 4:
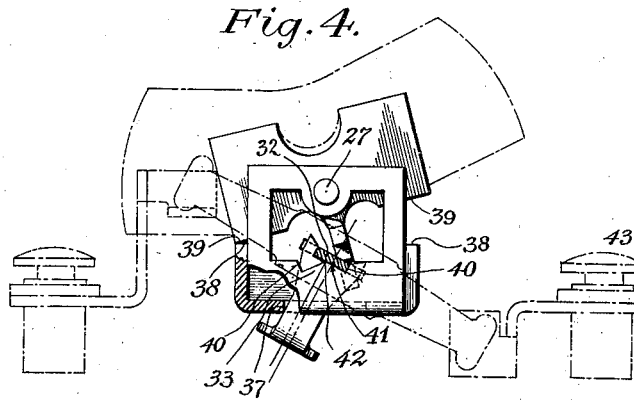
Fig. 4 is a side view of the switch-actuating mechanism, part of the frame being broken away to show the stops for the crank member and rocker, and the flat bearing portion of the crank shown in section to illustrate how it engages the knife-edge bearing.
Figure 5:
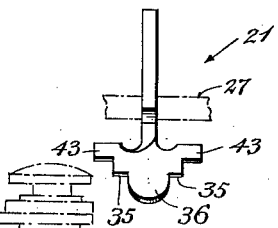
Fig. 5 is a detail view of the rocker arm.

This is accomplished in the embodiment of the present invention illustrated herein by providing stop shoulders 40 at each side of the base of the sloping sides 41 of the knife-edge bearings 33a in such places that in position of rest the apex or point 42 of each knife-edge bearing lies directly under a point on the flat bearing portion 32 of the crank which is off-set from the physical center of the crank, which center is indicated in dot-and-dash lines in Fig. 4. In this position of rest, as shown in Fig. 4, the flat bearing portion 32 lies on one of the sloping sides 41 of the bearing, and when the spring 34 is placed under tension and its upper end is moved to a predetermined point, the flat bearing portions 32 at their off-set points fulcrum on the point 42 of the bearing until the arms 28 of the crank engage the stop shoulders 37 on the bottom of the frame 22 after which the continued urging of the spring causes the flat bearing portions to slide down the other slope 41 of the bearing and cause a point on the flat bearing portion 32 at the other side of the physical center thereof to lie over the apex or point 42 of the bearing 33.

Occasionally, due to excessive corrosion and oxidization of the engaging portions of the switch arm 20 and its contacts 17 and 18 and for other causes, the switch arm 20 sticks and prevents the yoke 28 from moving, even when it should do so under the influence of the spring 34. To obviate this difficulty, it has been previously proposed to provide starting devices to initiate movement of the crank. These starting devices of the prior art were made to always operate whether or not the switch arm failed to move. The present invention makes a decided departure from this, however, and provides a starting device which only engages the crank to initiate its movement if the crank should fail to start at the proper point in the operation of the switch. Hence, the operating mechanism is not burdened normally by the operation of the starting device and is only used when actually needed. Moreover, excessive wearing of the switch is avoided and longer life is given by reason of this feature of the present invention.

Figure 6:
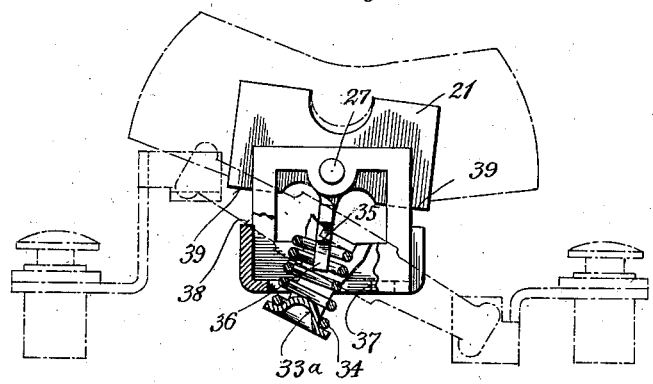
Fig. 6 is like Fig. 4, but shows the positions of the parts at the point in the oscillation of the rocker, where movement of the crank will be positively initiated should it have failed to move under the influence of the spring which is interposed between the rocker and the crank.

This is accomplished in the embodiment of the invention herein illustrated by providing ears 44 on the arms 30 of the crank which are of such dimensions that in position of rest a pair of the ears 44, one at each side of the crank, protrudes above and beyond the point or apex 42 of the knife-edge bearings, and by providing lugs 43 on the rocker 20 adapted to move into engagement with the ears 44 in case the crank should remain in position of rest at a point in the operation of the rocker where it should have started to move. This condition of affairs is illustrated in Fig. 6, in which the lugs 43 are just engaging the ears 44 of the crank. The continued movement of the lugs 43 will cam down the ears 44 with the result that movement of the crank will be started positively. From Fig. 6, it will be noted that the rocker has moved to carry the upper end of the spring 34 beyond the axis of oscillation of the crank and that the crank should have commenced to move before the rocker reached the point where it is shown.

Figure 8:
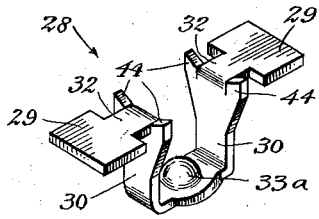
Figs. 7 and 8 are perspective views of the frame and crank member respectively.

Preferably, the crank 28 is made of sheet metal from a blank which is formed up to give the desired shape shown in Fig. 8. In order that the crank may be thus made in one piece and yet enable it to be assembled in the frame 22 after the latter has been given its final shape, the side walls 23 of the frame are provided with openings 45, in the lower margins of which, the knife-edge bearings are formed. The openings 45 are of such magnitude that the crank may be inserted in the frame by being moved longitudinally through the openings 45 in the side walls. In assembling the switch-actuating mechanism this is done first, then the spring 34 is placed on the seat 33 of the crank. Then the rocker is placed in the open top of the frame so that the projection 36 extends into the top portion of the spring 34 and the rocker is pressed inwardly until its aperture aligns with the bearings 26 in the frame, at which time the pin or axle 27 is slid through the aligning holes to lock the assembly together. Then the switch arm 20 which is provided wth a rectangular opening 47 to fit the extensions 29 of the crank is slid thereon. This mounting of the switch arm and the switch arm itself is described in my copending application, Serial No. 298,218, filed August 8th, 1928, now Patent No. 1,821,180.

The frame 23 is then mounted in the base 10 and casing 11 so as to be held firmly therein when the base and casing are secured together by the screws 12. In this mounting of the frame 22 in the base and casing, it is unnecessary to secure the frame in place by screws or other anchoring means between the frame and the base, but these features and constructions will not be described in detail herein, since they form the subject-matter of my copending application, Serial No. 336,105, filed January 30, 1929.

Variations and modifications may be made within the scope of this invention, and portions of the improvements may be used without others.

Having thus described the invention, what is claimed as new and for which it is desired to obtain Letters Patent, is:—

1. In a snap switch, a hollow polyhedral frame having side walls provided with bearing surfaces; and a crank shaft fulcrumed on said bearing surfaces, said side walls having enclosed apertures communicating with said bearing surfaces and of such dimensions as to permit said crank shaft to be introduced longitudinally into said hollow frame through said apertures and into a position to be fulcrumed on said bearing surfaces.

2. In a snap switch, a hollow polyhedral frame having side walls provided with bearing surfaces and a bottom wall; and a crank shaft fulcrumed on said bearing surfaces, the arms of the crank shaft being adapted to lie within said frame and protrude through an opening in the bottom wall of the frame, said opening being of such dimensions that the ends thereof engage the crank arms when the latter are oscillated from one position of rest to another to limit the oscillatory movements of the crank shaft.

3. In a snap switch, a hollow polyhedral frame having end walls, an open top, and side walls provided with bearings; and a rocker fulcrumed in said bearings, extending into said open top and overlying the end walls, said end walls being of such dimensions as to form stops for limiting the extent of rocking movements of the rocker.

4. In a snap switch, a hollow polyhedral frame having end walls, an open top, and side walls provided with two pairs of bearings; a crank shaft fulcrumed on one pair of said bearings, the arms of said crank shaft being adapted to lie within said frame, and protrude through an opening in the bottom of the frame, said opening being of such dimensions that the ends thereof are engaged by the crank arms when the latter are oscillated from one position of rest to another to limit the oscillatory movements of the crank shaft; and a rocker fulcrumed on the other pair of said bearings extending into said open top and overlying the end walls, said end walls being of such dimensions as to form stops for limiting the extent of rocking movements of the rocker.

5. In a snap switch, a hollow polyhedral frame having end walls, an open top, and side walls provided with two pairs of bearings; a crank shaft fulcrumed on one pair of said bearings, the arms of said crank shaft being adapted to lie within said frame, and protrude through an opening in the bottom of the frame, said opening being of such dimension that the ends thereof are engaged by the crank arms when the latter are oscillated from one position of rest to another to limit the oscillatory movements of the crank shaft; a rocker fulcrumed on the other pair of said bearings extending into said open top and overlying the end walls, said end walls being of such dimensions as to form stops for limiting the extent of rocking movements of the rocker; and spring means normally biased to hold the rocker in engagement with one end wall of the frame and the crank arms in engagement with one end wall of the opening in the bottom of the frame.

6. In a snap switch, a hollow polyhedral frame having a bottom wall and end walls; a crank fulcrumed in the frame; a rocker fulcrumed in the frame; a spring between the rocker and the crank shaft adapted to cause the crank shaft to oscillate with a snap action from one position of rest to another upon rocking movement of the rocker; and stop surfaces on the bottom wall and end walls of the frame to limit oscillatory movement of the crank shaft and rocker respectively.

7. In a snap switch, a hollow polyhedral frame having a bottom wall and end walls; a crank fulcrumed in the frame; a rocker fulcrumed in the frame; a spring between the rocker and the crank shaft adapted to cause the crank shaft to oscillate with a snap action from one position of rest to another upon rocking movement of the rocker; and stop surfaces on the bottom wall and end walls of the frame to limit oscillatory movement of the crank shaft and rocker respectively, the plane of each stop surface on the bottom wall being at right angles to the plane of the stop surface on the adjacent end wall.

8. In a snap switch, a frame having at each side a knife-edge bearing; a crank having substantially flat bearing portions adapted to normally lie at either one side or the other of the points of said knife-edge bearings; and means for oscillating said crank shaft from one position of rest to another, said means causing the flat bearing portions on the crank shaft to fulcrum on the points of the knife-edge bearings and move from one position of rest at one side of the knife-edge bearings to the other position of rest at the other side of the knife-edge bearings, the latter engaging the same faces of the flat bearing portions in both directions of oscillation.

9. In a snap switch, a frame provided at each side with a knife-edge bearing having sides sloping downwardly from the point thereof; a crank having substantially flat bearing portions adapted in position of rest to lie against the sloping sides of the knife-edge bearings; means for oscillating said crank shaft from one position of rest to another, said means causing the flat bearing portions on the crank shaft to fulcrum on the points of the knife-edge bearings and move from one position of rest at one side of the knife-edge bearings to the other position of rest at the other side of the knife-edge bearings; and means for causing the points of the knife-edge bearings to engage the flat bearing portions at one place thereon when the crank is oscillated from left to right and at another place, offset from the first-named place but on the same faces of the flat bearing portions, when the crank is operated from right to left.

10. In a snap switch, a frame provided at each side with a knife-edge bearing having sides sloping downwardly from the point thereof; a crank having substantially flat bearing portions adapted in position of rest to lie against the sloping sides of the knife-edge bearings; means for oscillating said crank shaft from one position of rest to another, said means causing the flat bearing portions on the crank shaft to fulcrum on the points of the knife-edge bearings and move from one position of rest at one side of the knife-edge bearings to the other position of rest at the other side of the knife-edge bearings; and stops so located that when the crank is oscillated the flat bearing portions of the crank are engaged by the points of the knife-edge bearings at either one side or the other of the physical center of the flat bearing portions and on the same face of each of the latter.

11. In a snap switch, a frame having at opposite sides knife-edge bearings each having sides sloping downwardly from the point thereof; a crank having substantially flat bearing portions adapted in position of rest to lie against the sloping sides of the knife-edge bearings; means for oscillating said crank shaft from one position of rest to another, said means causing the flat bearing portions on the crank shaft to fulcrum on the points of the knife-edge bearings and move from one position of rest at one side of the knife-edge bearings to the other position of rest at the other side of the knife-edge bearings; stops at the ends of the sloping sides of the knife-edge bearings, said stops being so located that when the crank is oscillated the flat bearing portions of the crank are engaged by the points of the knife-edge bearings at either one side or the other of the physical center of the flat bearing portions, a portion of each flat bearing of the crank shaft extending beyond and above the point of its knife-edge bearing; and means for engaging the upwardly extending portion of one of said bearings for initiating the movement of the crank shaft should the latter fail to move under the influence of said means for oscillating the crank shaft.

12. In a snap switch, a frame having at opposite sides knife-edge bearings; a crank having substantially flat bearing portions adapted to normally lie on either side or the other of said knife-edge bearings; means for oscillating said crank shaft from one position of rest to another, said means causing the flat bearing portions on the crank shaft to fulcrum on the points of the knife-edge bearings and move from one position of rest at one side of the knife-edge bearings to the other position of rest at the other side of the knife-edge bearings, a portion of each flat bearing of the crank shaft extending beyond and above the point of its knife-edge bearing; and means for engaging the upwardly extending portion of one of said bearings for initiating the movement of the crank shaft should the latter fail to move under the influence of the said means for oscillating the crank shaft.

13. In a snap switch, a polyhedral frame having a substantially rectangular aperture in each of its side walls, each wall having a pair of juxtaposed V-shaped notches opening into said aperture and forming between them an inverted V-shaped projection, the apex of which constitutes a crank member fulcrum.

14. In a snap switch, a frame having side walls each provided with an aperture, each wall having a pair of juxtaposed V-shaped notches opening into said aperture and forming between them an inverted V-shaped projection, the apex of which constitutes a crank member fulcrum.

15. In a snap switch, a frame having side walls each provided with an aperture, each wall having a pair of juxtaposed V-shaped notches opening into said aperture and forming between them an inverted V-shaped projection; and a crank member having flat bearing portions each adapted to fulcrum on one of said inverted V-shaped projections.

16. In a snap switch, a frame having side walls each provided with an aperture, each wall having a pair of juxtaposed V-shaped notches opening into said aperture and forming between them an inverted V-shaped projection; and a crank member having flat bearing portions each adapted to fulcrum on one of said inverted V-shaped projections, said flat bearing portions having edges adapted to alternately engage the bottom of the V-shaped notches at the sides of the inverted V-shaped projection.

17. In a snap switch, a frame having side walls each provided with an aperture, each wall having a pair of juxtaposed V-shaped notches opening into said aperture and forming between them an inverted V-shaped projection; and a crank member having flat bearing portions each adapted to fulcrum on one of said inverted V-shaped projections, said flat bearing portions having edges adapted to alternately engage the bottom of the V-shaped notches at the sides of the inverted V-shaped projection, and said flat portions each having a physical center adapted to lie between the apex of the inverted V-shaped projection and the notch in which the said edge of the flat bearing portion lies.

18. In a snap switch, a frame having side walls each provided with an aperture, each wall having a pair of juxtaposed V-shaped notches opening into said apertures and forming between them an inverted V-shaped projection; and a crank member having flat bearing portions each adapted to fulcrum on the apex of one of said inverted V-shaped projections, said flat bearing portions having a bearing surface, the width of which is less than the sum of the sides if the inverted V-shaped projection which it engages.

Signed at Stratford, in the county of Fairfield and State of Connecticut, this 25th day of September, 1928.

ARTHUR C. GAYNOR.